May 15, 1956   C. A. STRAYER   2,745,357
PRESSURIZED HYDRAULIC RESERVOIR
Filed Oct. 22, 1951   3 Sheets-Sheet 1

INVENTOR:
Chalmers A. Strayer
By Herbert E. Metcalf
HIS PATENT ATTORNEY

May 15, 1956

C. A. STRAYER 2,745,357

PRESSURIZED HYDRAULIC RESERVOIR

Filed Oct. 22, 1951

INVENTOR:
Chalmers A. Strayer
By Hubert E. Metcalf
HIS PATENT ATTORNEY

# United States Patent Office 2,745,357
Patented May 15, 1956

2,745,357

PRESSURIZED HYDRAULIC RESERVOIR

Chalmers A. Strayer, Wilmington, Calif., assignor to Northrop Aircraft, Inc., Hawthorne, Calif., a corporation of California Application October 22, 1951, Serial No. 252,537

11 Claims. (Cl. 103—223)

The present invention relates to aircraft hydraulic systems and more particularly to an improved pressure type reservoir therefor.

Current aircraft design is making greater demands on hydraulic power transmission systems from a standpoint of weight and space as well as efficiency.

It has been the general practice, in aircraft hydraulic power transmission systems, to pressurize the fluid in the system reservoir so that a suction head is maintained for the system pump at all times during the operation of the system. Compressed air or gas, stored in a container aboard the airplane, is usually connected to supply the pressure necessary for pressurizing the reservoir. In some instances air compressors and regulating devices therefor are installed aboard the aircraft for reservoir pressurization. In either of the previously mentioned cases, a penalty is exacted against the airplane, both from a weight standpoint as well as space, in addition to the added complexities in service and maintenance. Provisions must also be made for the volumetric change which occurs in the stored fluid at high altitudes. In some instances complex multiple telescoping reservoirs have been devised, but have not proven to be too satisfactory due to the sealing problems involved, for example.

In view of the pressure type reservoir problems, a few of which have been enumerated above, it is an object of this invention to provide a pressure type reservoir in which pressure from an external source is not required for normal pressurization thereof.

It is another object of this invention to provide a pressure type reservoir which will operate efficiently in extreme temperature ranges.

It is a further object of this invention to provide a pressure type reservoir requiring but a minimum of space in an aircraft, and which is comparatively light in weight.

It is a still further object of this invention to provide a pressure type reservoir which will automatically allow for volumetric changes in the stored fluid.

It is still another object of the present invention to provide a reservoir pressurizing means which will operate independently of an energy source outside of the main hydraulic system.

Other objects and advantages of the present invention will become apparent as the disclosure continues.

Briefly, the present invention, in one preferred form, comprises a cylinder-piston type reservoir having pressurizing means integrally incorporated into the reservoir piston; the necessary forces for operating the pressurizing means being supplied from the main hydraulic system, and an accumulator which is also integrally incorporated into the reservoir piston; the accumulator being precharged with compressed air or gas for the operation thereof.

In the operation of the reservoir of the present invention, a positive internal-external pressure difference is maintained in the reservoir throughout its capacity range so that a minimum positive suction head is provided for a system pump under substantially all flight conditions and at flight altitudes up to 60,000 ft.

The present invention will be more clearly understood by referring to the specification drawings wherein.

Figure 1:
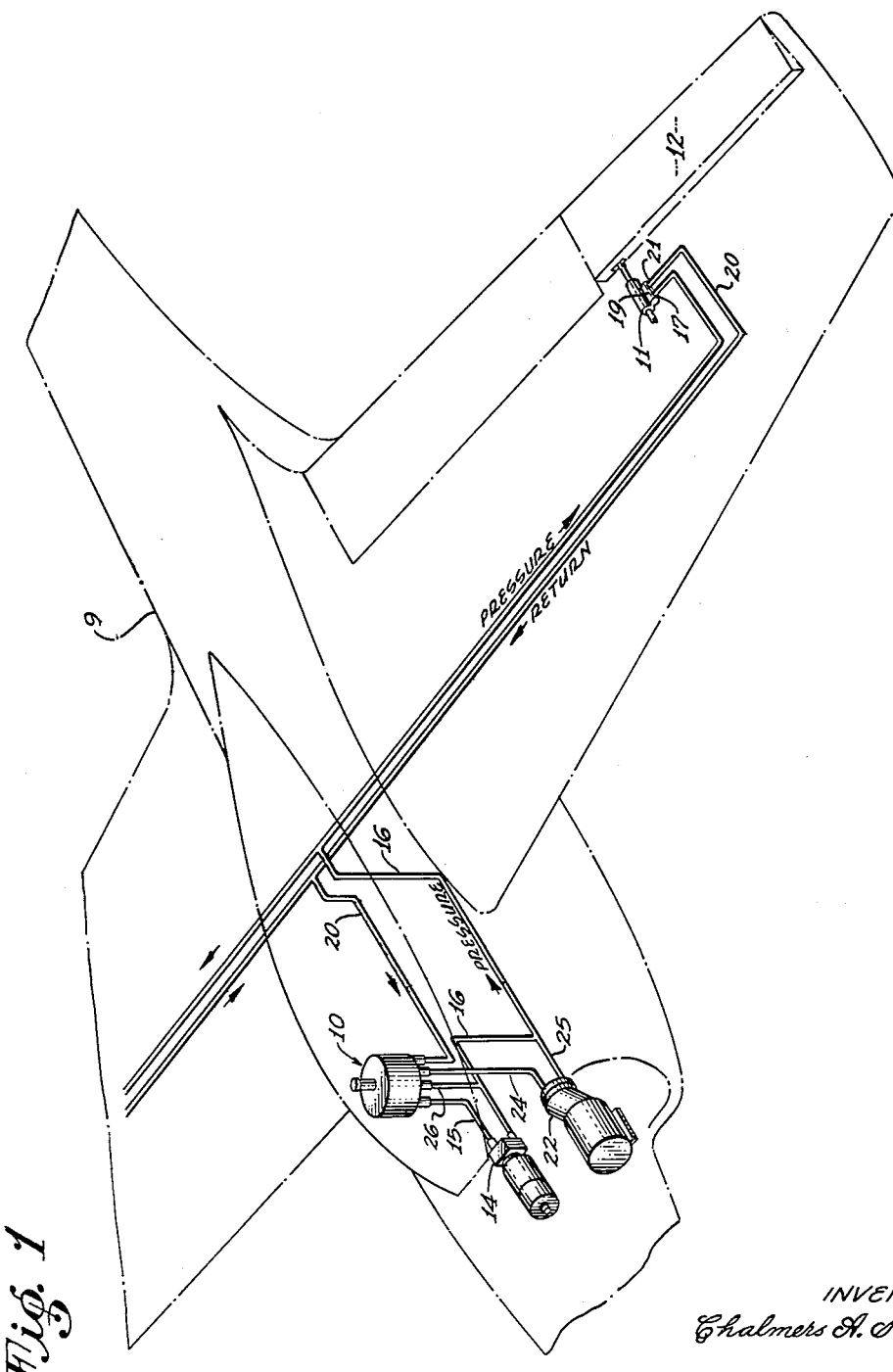
Figure 1 is a diagrammatic view in perspective, showing the reservoir of the present invention, in one preferred form, installed in an aircraft hydraulic system.

For a general description, Figure 1 shows a hydraulic system in an aircraft 9 (check valves, relief valves, etc., are omitted for clarity) with the reservoir 10 of the present invention installed therein.

Hydraulic power is supplied, by an engine driven variable volume pump 14, to a hydraulic power actuator 11 which operates a control surface 12, for example. The pump 14 draws fluid from the reservoir 10 through a suction line 15 and transmits the fluid into a pressure line 16 which is connected to the pressure port 17 of a power actuator servo valve 19. A return line 20 is connected into the servo valve return port 21 and carries return fluid back into the reservoir 10.

An electrically driven emergency pump 22 is provided in the event of failure of the main system pump 14. The emergency pump 22 is connected to the reservoir 10 by a separate suction line 24. An emergency pump pressure line 25 is connected into the main pressure line 16 to the power actuator 11.

Operating fluid for pressurizing the reservoir 10 is supplied by the main pump 14, or the emergency pump 22 when the emergency system is in use, through a pressure supply line 26 which enters through the bottom of the reservoir 10. A detailed description of the reservoir 10 construction follows.

Figure 2:
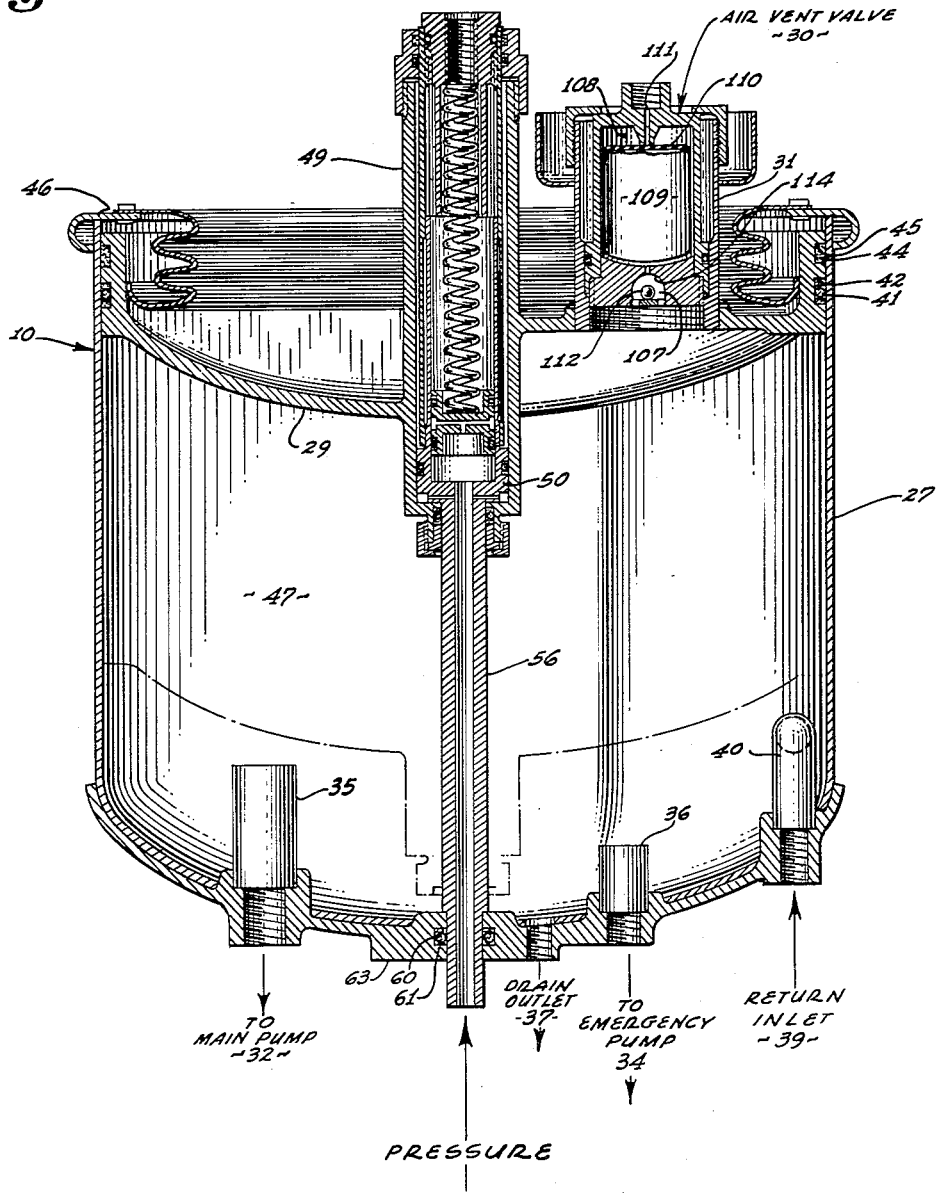
Figure 2 is a side elevational view in longitudinal section, taken through the center of the reservoir shown in Figure 1.

Referring to Figure 2, the reservoir 10 comprises a reservoir cylinder 27, of a given capacity, having one end thereof enclosed as shown, a reservoir pressurizing piston 29, and an air venting valve 30, which is incorporated into a filler well 31 in the reservoir piston 29. The air venting valve 30, referred to herein, is not a claimable part of the present invention, but is described, shown and claimed in U. S. application, Serial No. 252,536, filed October 22, 1951.

Two pump supply ports 32 and 34, having stand pipes 35 and 36 mounted therein, are provided in the closed end of the reservoir cylinder 27, for the main pump and emergency pump respectively. A drain outlet 37 is positioned at the lowest point of the reservoir cylinder and can be connected to a drain line (not shown). A return fluid inlet 39 is preferably positioned as far as is practical from the supply ports 32 and 34 and has a standpipe 40 mounted therein, which has a right angle portion at the top end thereof to minimize turbulence and disperse entrapped air in the return fluid.

The reservoir piston 29 is mounted in the open end of the reservoir cylinder 27 and is longitudinally movable therein. An O ring 41 in an annular groove 42, which extends around the periphery of the reservoir piston 29, provides a seal therefor. A wiper seal 44 is also provided in another annular groove 45 which is adjacent the O ring groove 42.

To prevent contamination of the seals 41 and 44, a removable flexible dust shield 46, preferably made of a fire resistant material, is mounted to the top of the reservoir 10.

The area between the reservoir piston 29 and the closed end of the reservoir cylinder 27 provides a fluid storage chamber 47 of variable size.

The reservoir piston 29 has a pressurizing cylinder 49 coaxially mounted therein and movable therewith. One end of the pressurizing cylinder 49 extends into the storage chamber 47 and an enlarged view of the pressurizing cylinder 49 is shown in Figure 3.

A stationary piston 50 is mounted inside of the pressurizing cylinder 49, the pressurizing cylinder 49 being longitudinally slidable thereon. The pressurizing piston 50 has an O ring 51 retained in an annular groove 52 around the periphery thereof, and a wiper seal 54 which is provided in a parallel groove 55 adjacent the O ring groove 52. A piston rod 56 having an axial fluid duct 57, extending longitudinally therethrough and open at each end thereof, is fixed at one end thereof in the closed end of the reservoir cylinder 27 as shown in Figure 2, being sealed therein by an O ring seal 60 in an annular internal groove 61 in a boss 63.

Figure 3:
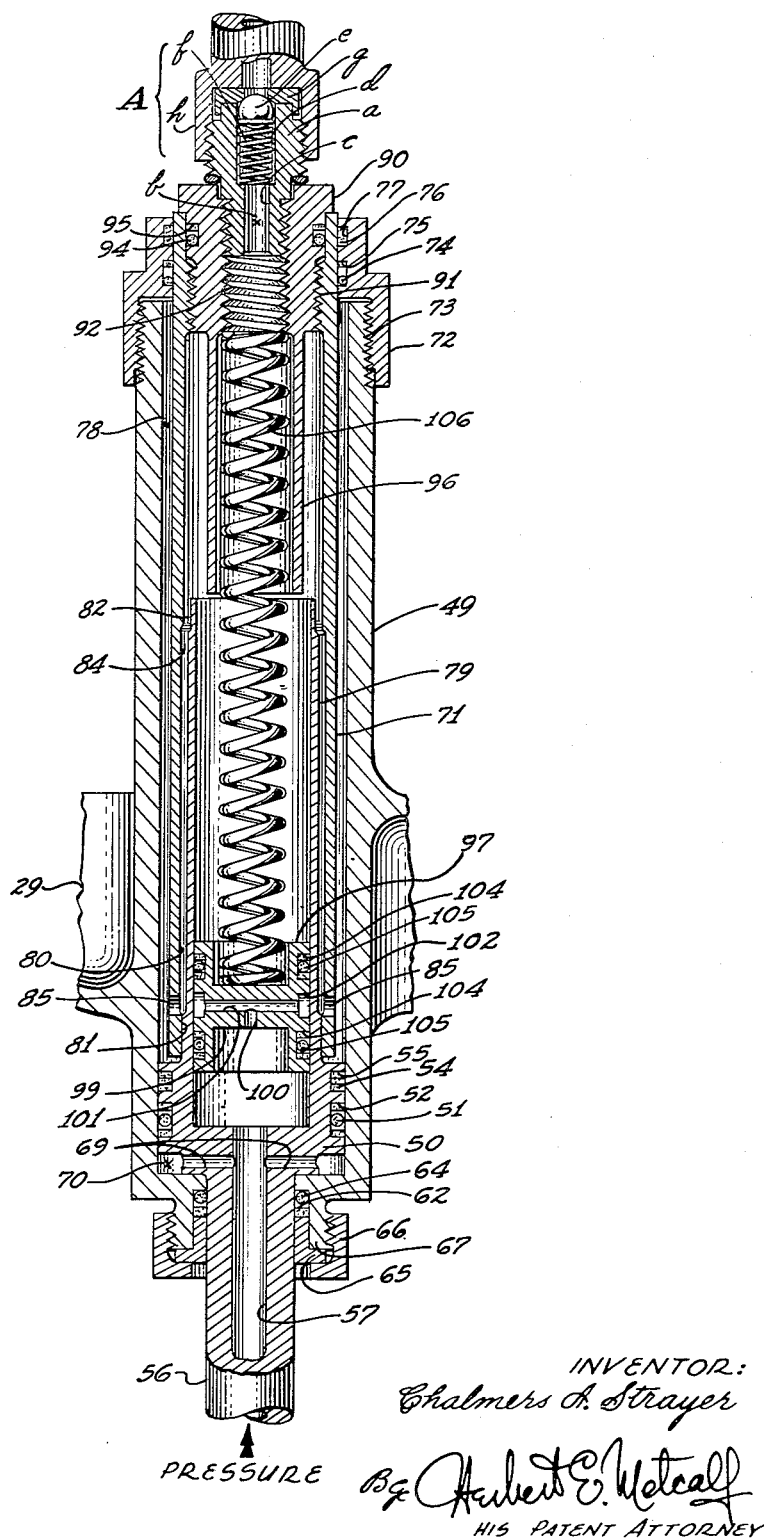
Figure 3 is an enlarged elevational view in longitudinal section taken through the center of the pressurizing piston assembly of the reservoir shown in Figure 2.

The other end of the rod 56 extends through the reservoir storage chamber 47 and connects to the pressurizing piston 50, as shown in Figure 3. The pressurizing cylinder 49 has an internal shoulder 62 which seats an O ring seal 64. A gland bearing 65 is positioned in the end of the pressurizing cylinder 49 outwardly of the O ring 64 and is retained in place by a cap 66 which is threaded onto the threaded portion 67 of the pressurizing cylinder 49. Lateral fluid passages 69, which transversely intersect the fluid duct 57, are provided in the piston rod 56 adjacent the pressurizing piston 50 to connect the operating space 70 in the pressurizing cylinder 49 with the fluid duct 57 of piston rod 56.

An accumulator cylinder 71 is mounted inside of the pressurizing cylinder 49, and has one end thereof connected to the pressurizing piston 50, or can be made integral therewith. The other end of the accumulator cylinder 71 extends out of the pressurizing cylinder 49 through a cap assembly 72 which is threaded onto a threaded end portion 73 of the cylinder 49. An O ring 74 in an annular groove 75 in the cap assembly 72 seals the pressurizing cylinder 49 thereon. A wiper seal 76 in a parallel groove 77 is provided adjacent the O ring groove 75. An annular operating chamber 78 is formed between the inner wall of the pressurizing cylinder 49 and the outer wall of the accumulator cylinder 71, the function of which will be described later.

A sleeve 79, having a smaller diameter than the accumulator cylinder 71, is mounted inside the accumulator cylinder 71 being connected at one end thereof to the pressurizing piston 50, or made integral therewith. The other end of the sleeve 79 extends a predetermined distance from the piston 50 and is open in the accumulator cylinder 71 as shown. The inner wall of the accumulator cylinder 71 has an indented area 80 around the periphery thereof which extends from a shoulder portion 81 internally of the end adjoining the pressurizing piston 50, and terminates adjacent the open end of the sleeve 79. The sleeve 79 has an annular indentation 82 extending around the outer periphery of the open end thereof, forming an annular passage 84 between the indented area 80 of the accumulator cylinder 71 and the outer wall of the sleeve 79. The accumulator cylinder 71 has a number of openings 85 therethrough, adjacent the pressurizing piston 50, which connect the operating chamber 78 with the passage 84. The openings 85, as it can be seen, will remain enclosed throughout the entire stroke of the pressurizing cylinder 49.

The outer end of the accumulator cylinder 71 is enclosed by a plug assembly 90 which is threaded into an internal threaded portion 91 therein. A threaded inlet bore 92 extends through the plug 90 and is provided to receive an inlet valve or be sealed by another plug as desired. In Figure 3, a simple air inlet valve A is shown for example, and comprises a valve body $a$ threaded into the inlet bore 92 of the cylinder plug 90, an axial valve bore $b$ of two diameters $c$ and $d$, a ball seal $e$ mounted in the large diameter $d$ of the valve bore $b$, a valve spring $f$ retaining the ball $e$ against a ball seat $g$, which is positioned at the outer end of the valve body, and a valve cap $h$. The outer end of the valve cap can be adapted for filling from a common compressed gas container, or connected to a source of stored air as desired. To prevent leakage around the plug 90, an O ring 94 is retained in an annular groove 95 around the periphery of the plug 90. A sleeve portion 96 extends axially into the accumulator cylinder 71 from the plug 90 and is connected thereto or made integral therewith.

An accumulator piston 97 is slidably enclosed in the pressurizing piston sleeve 79. The accumulator piston 97 is counter-bored axially from each end thereof, forming a central partition 99 therein. From the pressurizing piston 50 side of the accumulator piston 97, an axial bore 100 intersects a lateral passage 101 which extends transversely through the central partition 99 of the piston 97. Each end of the lateral passage 101 opens into an annular fluid groove 102 which extends around the periphery of the accumulator piston 97. Annular grooves 104 on each side of the fluid groove 102 retain O ring seals 105. Fluid is directed from the fluid duct 57 of the piston rod 56, into the fluid groove 102 and provides equal force on the O rings 105 to provide a bearing area which will insure proper sliding of piston 97 within the sleeve 79.

A preloaded spring 106 is interposed between the accumulator piston 97 and the plug 90 assembly, being retained in the plug sleeve 96 at one end and abutting accumulator piston 97 at the other end thereof, to exert a predetermined force against the accumulator piston 97 in opposition to the main system pressure on the other side thereof as will be explained.

In general operation the accumulator is charged with compressed gas or air by means of the filler valve A in the accumulator cylinder 71 or from a remote connection. Air from the accumulator acts against the top of the pressurizing piston 50 by entry through the cylindrical passage 84 between the wall of the accumulator cylinder 71 and the wall of the accumulator sleeve 79. This differential pressure acting in opposition to the fluid pressure from the reservoir side is normally sufficient to overcome the friction loads on the reservoir piston seals which might otherwise be too great for practical manual retraction of the reservoir piston 29 during filling operations, for example.

The reservoir piston 29 will move upwardly, due to the accumulator charge, when the filler neck 31 is opened and the vent valve 30 retracted to a point where the vent external seal is no longer effective. At this point, air enters the reservoir chamber 47 and allows the force of accumulator air to retract the reservoir piston 29 to the filling position.

Referring once again in Figure 2, entrapped air in the reservoir 10 is automatically vented therefrom through the air venting valve 30 which is installed inside the filler neck 31 in the reservoir piston 29. Fluid from the reservoir storage chamber 47 enters a duct 107 and passes into a chamber 108 in the vent valve 30. The reservoir storage chamber 47 is thus maintained substantially free of all but the occluded air in the fluid.

Air introduced into the reservoir storage chamber 47 during operation will normally enter the valve chamber 108 by displacing fluid therein. Within the valve chamber 108 is a hollow, weighted metallic float 109 having a soft sealing material 110 attached to the top surface thereof. As fluid is displaced by air from the reservoir chamber 47, the float 109 will drop because of insufficient buoyancy and allow any air to be vented through a small orifice 111 positioned in the top of the valve 30. The float 109 has sufficient weight to drop from the orifice 111 against full reservoir pressurization when the fluid level drops in the float chamber 108. The float 109 also has sufficent volume to be floated against and thus seal the orifice 111 when fluid is returned to the float chamber 108.

Under conditions of inverted flight reservoir pressure will normally keep the float 109 sealed against the orifice 111 preventing the leakage of oil from the reservoir 10. In the event, however, of a "G" loading during inverted flight, which would tend to pull the float 109 away from the orifice 111, weight of the float 109 will prevent its remaining away from the orifice 111 for any appreciable length of time, provided float 109 is not under flotation from fluid in chamber 108. Fluid in the float chamber 108 prior to the inverted flight maneuver will be displaced to the opposite end thereof but a ball 112 which is provided in the duct 107 intermediate the float chamber 108 and the reservoir chamber 47 will prevent air from leaking back into the reservoir chamber 47. Thus, since oil cannot enter the float chamber 108, the float 109 will return to its original position and reseal the orifice 111.

It can thus be seen from the foregoing that pressurization of the reservoir 10 of the present invention is entirely obtained by fluid pressure from the main hydraulic system acting upon the pressurizing cylinder 49 which is attached to the reservoir piston 29.

Referring once again to Figures 2 and 3, fluid pressure is obtained from the main system and directed into the fluid duct 57 through the piston rod 56 and thence into the operating space 70 of the pressurizing cylinder 49.

Fluid entering the pressurizing cylinder 49 also enters the accumulator cylinder 79. (The accumulator cylinder 79 is precharged with air pressure, the function of which will be described later.) The spring 106 serves to maintain a pressure unbalance on the accumulator piston seals 105 to provide a more positive sealing action. Air pressure serves the primary requirements of stored energy for the accumulator piston 97 action.

Primarily, the accumulator is provided to maintain a reasonably uniform pressure on the fluid in the reservoir 10. Should fluid surges become severe enough to cause excessive accumulator pressure, an external relief valve (not shown) can be provided to drop the pressure to the working range of the accumulator. Continuous unloading of the relief valve, however, would normally be prevented by accumulator action.

In the event of a main system failure with resulting emergency pump 22 operation, reservoir pressure will be preserved by the accumulator to provide a positive suction head to the emergency pump 22. Pressure from the emergency system can then be used to regulate the reservoir pressure. Under normal flight conditions the accumulator capacity is sufficient to provide adequate pressurization without the withdrawal of fluid from the emergency system.

Further, when starting the main hydraulic system on the ground, and particularly at low temperatures, positive pump suction head is preserved by action of the accumulator. In the event the accumulator air supply is depleted from a long period of inactivity or from filling the reservoir, a main hydraulic system hand pump (not shown) can be provided for recharging.

Visual means, such as an electric gauge for example, can be mounted on the reservoir to show the relationship of the fixed pressurizing piston 50 and the reservoir piston 29. Since all air is removed from the reservoir when under pressure, a device of the nature described above would indicate the level of fluid in the reservoir 10.

It can thus be seen that the reservoir of the present invention in the embodiment described and shown herein fulfills the necessary requirements for an aircraft hydraulic power transmission system.

Installation, service and maintenance of this reservoir is comparatively simple and the manufacture thereof relatively economical.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. A hydraulic reservoir for a hydraulic system, comprising a first cylinder closed at one end thereof, a first piston extending across and movable longitudinally in said first cylinder to define a fluid reservoir of variable size, a second cylinder coaxially mounted on and movable with said first piston, a second piston inside of said second cylinder, a piston rod fixed to the closed end of said first cylinder and extending axially through said reservoir and attached to said second piston, said second cylinder being provided with an axial seal around said piston rod to define an operating space, an operating fluid inlet, an operating fluid duct connecting said operating fluid inlet with said operating space through said piston rod, a reservoir fluid inlet, and a reservoir fluid outlet for said reservoir.

2. A hydraulic reservoir for a hydraulic system, comprising a first cylinder closed at one end thereof, a first piston extending across and movable longitudinally in said first cylinder to define a fluid reservoir of variable size, a second cylinder coaxially mounted on and movable with said first piston, a second piston inside of said second cylinder, a piston rod fixed to the closed end of said first cylinder and extending axially through said reservoir and attached to said second piston, said second cylinder being provided with an axial seal around said piston rod to define an operating space, elastic means mounted in said second cylinder to move said second cylinder on said second piston against said operating fluid, a reservoir fluid inlet, and a reservoir fluid outlet for said reservoir.

3. A hydraulic reservoir for a hydraulic system, comprising a first cylinder closed at one end thereof, a first piston extending across and movable longitudinally in said first cylinder to define a fluid reservoir of variable size, a second cylinder coaxially mounted on and movable with said first piston, one end of said second cylinder being positioned in said first cylinder, a second piston inside of said second cylinder, a piston rod fixed to the closed end of said first cylinder and extending axially through said reservoir and attached to said second piston, said second cylinder being provided with an axial seal around said piston rod at said end in said reservoir to define a fluid operating space in said second cylinder, an operating fluid inlet, an operating fluid duct connecting said operating fluid inlet with said fluid operating space through said piston rod, a third cylinder coaxially mounted inside of said second cylinder, one end of said third cylinder being connected at one end thereof to said second piston, the other end of said third cylinder extending out of said second cylinder opposite the end thereof in said reservoir, said second cylinder being provided with an axial seal around said third cylinder and slidable thereon, the space between the inner wall of said second cylinder and the outer wall of said third cylinder defining a compressed gas operating space, a sleeve coaxially mounted inside of said third cylinder, said sleeve being connected at one end thereof to said second piston, the other end of said sleeve being open in said third cylinder, the space between the inner wall of said third cylinder and the outer wall of said sleeve defining a compressed gas passage, said third cylinder having openings therethrough adjacent said piston to connect said compressed gas operating space with said compressed gas passage, a compressed gas inlet at said end of said third cylinder extending out of said second cylinder, an axial bore through said second piston connecting said operating fluid duct with the interior of said sleeve, a third piston movably positioned in said sleeve between said operating fluid duct and said compressed gas inlet, elastic means for urging said third piston toward said operating fluid duct, a reservoir fluid inlet, and a reservoir fluid outlet for said reservoir.

4. A hydraulic reservoir for a hydraulic system, comprising a first cylinder closed at one end thereof, a first piston extending across and movable longitudinally in said first cylinder to define a fluid reservoir of variable size, a second cylinder coaxially mounted on and movable with said first piston, one end of said second cylinder being positioned in said first cylinder, a second piston inside of said second cylinder, a piston rod fixed to the closed end of said first cylinder and extending axially through said reservoir and attached to said second piston, said second cylinder being provided with an axial seal around said piston rod at said end in said reservoir to define a fluid operating space in said second cylinder, an operating fluid inlet, an operating fluid duct connecting said operating fluid inlet with said fluid operating space through said piston rod, a third cylinder coaxially mounted inside of said second cylinder, one end of said third cylinder being connected at one end thereof to said second piston, the other end of said third cylinder extending out of said second cylinder opposite the end thereof in said reservoir, said second cylinder being provided with an axial seal around said third cylinder and slidable thereon, the space between the inner wall of said second cylinder and the outer wall of said third cylinder defining a compressed gas operating space, a sleeve coaxially mounted inside of said third cylinder, said sleeve being mounted at one end thereof to said second piston, the other end of said sleeve being open in said third cylinder, the space between the inner wall of said third cylinder and the outer wall of said sleeve defining a compressed gas passage, said third cylinder having openings therethrough adjacent said piston to connect said compressed gas operating space with said compressed gas passage, a compressed gas inlet at said end of said third cylinder extending out of said second cylinder, an axial bore through said second piston connecting said operating fluid duct with the interior of said sleeve, a third piston movably positioned in said sleeve between said operating fluid duct and said compressed gas inlet, a spring interposed between said third piston and said compressed gas inlet to urge said piston toward said operating fluid duct, means for sealing said compressed gas inlet, a reservoir fluid inlet, and a reservoir fluid outlet for said reservoir.

5. A reservoir for hydraulic system, comprising: a hydraulic fluid reservoir having one wall movably mounted in the reservoir in sealing engagement with the reservoir walls; a cylinder mounted on said movable wall; a piston mounted in said cylinder; a fixed hollow piston rod secured between a wall of said reservoir and said piston; said hollow piston rod being connected to a source of fluid under pressure, passages provided in said piston rod to direct pressure fluid from the interior thereof into an operating space between said piston and cylinder so that said pressure fluid will move said cylinder and movable wall mounted thereto into said reservoir against the hydraulic fluid therein to maintain a uniform pressure thereon; and elastic means operating within said cylinder on the opposite side of said piston from said rod to resist relative movement of said cylinder with respect to said piston.

6. Apparatus in accordance with claim 5 wherein said elastic means is a compression spring coaxially mounted in the latter said operating space, one end of said spring bearing on said opposite side of said piston, the other end of said spring bearing on the closed end of said cylinder.

7. Apparatus in accordance with claim 5 wherein said elastic means is a filling of compressed gas in said cylinder on said opposite side of said piston, said gas tending to resist relative movement of said cylinder with respect to said piston.

8. Apparatus in accordance with claim 5 wherein said elastic means is a compression spring coaxially mounted in the latter said operating space, one end of said spring bearing on said opposite side of said piston, the other end of said spring bearing on the closed end of said cylinder, and a filling of compressed gas being contained in said cylinder on said opposite side of said piston, said gas being an adjunct to said spring to resist relative movement of said cylinder with respect to said piston.

9. In a hydraulic circuit, the combination which includes a reservoir for storing a main supply of hydraulic fluid, a pump for withdrawing fluid from said reservoir for circulation through said circuit, and a return line to said reservoir; means for maintaining said reservoir fluid under substantially constant pressure comprising a portion of said reservoir being movable against said reservoir fluid, actuator means mounted on said movable reservoir portion and responsive to fluid pressure from said pump to move said movable reservoir portion against said fluid, and storage means arranged within said actuator for storing an auxiliary supply of reservoir pressurizing medium.

10. In a hydraulic circuit, the combination which includes a reservoir for storing a main supply of hydraulic fluid, a pump for withdrawing fluid from said reservoir for circulation through said circuit, and a return line to said reservoir; means for maintaining said reservoir fluid under substantially constant pressure comprising a portion of said reservoir being movable against said reservoir fluid, actuator means mounted on said movable reservoir portion, an operating space in said actuator and connected to the pressure side of said pump, said actuator being responsive to fluid pressure from said pump to move said movable reservoir portion against said reservoir fluid, means arranged within said actuator defining an accumulator for storing an auxiliary supply of reservoir pressurizing medium, and means associated with said accumulator to independently pressurize said reservoir fluid when said pump is inoperative.

11. In a hydraulic circuit, the combination which includes a reservoir for storing a main supply of hydraulic fluid under pressure, a pump for withdrawing fluid from said reservoir for circulation through said circuit, and a return line for returning said fluid to said reservoir; means for maintaining said reservoir fluid under substantially constant pressure comprising one end closure of said reservoir being mounted in said reservoir in sealing engagement with the walls thereof and movable toward the other end of said reservoir against said enclosed fluid, a hydraulic actuator coaxially mounted in said movable reservoir closure end and having an operating space connected to the pressure side of said pump, said hydraulic actuator being responsive to pressure fluid from said pump to move said closure end against said reservoir fluid to maintain said fluid under substantially constant pressure, an enclosed coaxial accumulator cylinder in said actuator and adapted to store an auxiliary supply of compressed gas, and a pressurizing piston mounted in said accumulator cylinder between said auxiliary supply of compressed gas and said pressure fluid from said pump to independently maintain said reservoir fluid under pressure when said pump is inoperative.

References Cited in the file of this patent
UNITED STATES PATENTS

| | | |
|---|---|---|
| 1,950,107 | Guinn et al. | Mar. 6, 1934 |
| 2,361,934 | Frazer-Nash | Nov. 7, 1944 |
| 2,469,794 | Sloan | May 10, 1949 |
| 2,605,716 | Huber | Aug. 5, 1952 |
| 2,619,915 | Ifield et al. | Dec. 2, 1952 |
| 2,673,527 | Ashton et al. | Mar. 30, 1954 |